Figure 2:
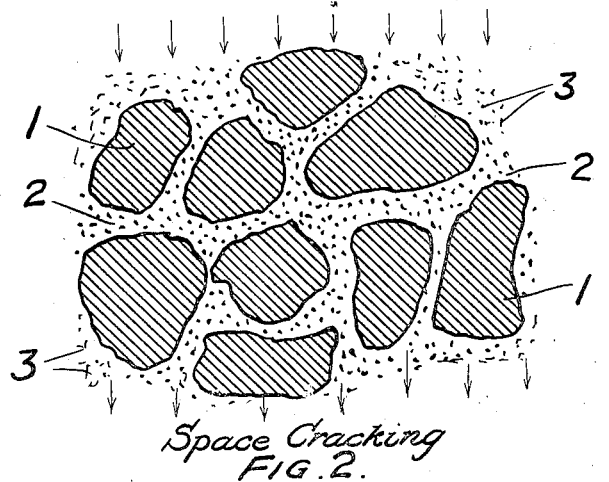

April 24, 1934.     H. G. TERZIAN     1,956,259
PROCESS OF MAKING GAS
Filed April 30, 1930

Space Cracking

Surface Cracking

INVENTOR
Harutyun G. Terzian
BY
Augustus B. Stoughton
ATTORNEY.

WITNESS:

Patented Apr. 24, 1934

1,956,259

UNITED STATES PATENT OFFICE 1,956,259

PROCESS OF MAKING GAS

Harutyun G. Terzian, Philadelphia, Pa., assignor to The United Gas Improvement Company, Philadelphia, Pa., a corporation of Pennsylvania Application April 30, 1930, Serial No. 448,795

16 Claims. (Cl. 48—197)

The present invention relates to the manufacture of gas rich in hydrogen by the pyrogenous decomposition of hydrocarbons.

More particularly it relates to the manufacture of such gas by passing hydrocarbons through an ignited bed of solid fuel, as for instance, coke.

The object of the invention is the provision of an economic and thermally efficient process for such gas manufacture, whereby the carbon released by the cracking of the hydrocarbons is retained in the fuel bed, substantially or to a very large extent depending on the degree of cracking, and is there used instead of fuel without substantially interfering with or diminishing the porosity of the fuel bed.

According to the present invention, an ignited bed of fuel, as for instance, the coke fuel bed of a standard water gas generator, is provided and maintained in ignited condition by periodic air blasting. Between air blasting operations, hydrocarbon fluid, as for instance, natural gas or oil refinery still gas or oil gas is passed through the fuel bed and cracked therein releasing carbon which is retained in the fuel bed, as will be hereafter more fully described without interfering with or substantially diminishing the porosity thereof. Also, between air blasting operations, steam is passed through the fuel bed reacting with the carbon from the hydrocarbons and with the fuel to form water gas. Some steam may be passed through the fuel bed with the hydrocarbons, but whether steam is passed with the hydrocarbons or not, I prefer to make a separate steam run through the fuel bed after the air blast and prior to the passage of the hydrocarbons. The passage of the steam through the fuel bed consumes the carbon released by the cracking of the hydrocarbons which is unconsumed by the air blast and prevents its accumulation.

The separate steaming step which precedes the passage of the hydrocarbons, however, has an added purpose which will be hereinafter set forth. When the heavier hydrocarbons are cracked in such a fuel bed, they are first cracked largely to methane and when the cracking is continued the methane cracks to hydrogen and carbon.

At temperatures up to the neighborhood of 1200° C., the decomposition of methane is a surface effect, the cracking is by contact with the hot surface. Above about 1200° C., decomposition takes place in space in the gas mass, as well as on the hot surface.

According to the present invention the above mentioned physical fact or law of nature is utilized, in the decomposition of hydrocarbons in an ignited fuel bed with the production of gas rich in hydrogen, for the purpose of retaining all, or controllable portions, of the deposited carbon on the surfaces of the fuel, where it does not substantially choke the porosity of the fuel bed and where it is well presented for utilization in place of fuel. If the temperature of the fuel bed is properly controlled, hydrocarbons, such as natural gas and oil refinery still gas may be largely decomposed by surface effect and substantially all of the released carbon can be retained on the surfaces of the fuel. This retention is in spite of the large flow of gas at relatively high velocity through the interstices of the fuel bed and across the surfaces.

If, however, the bulk of the carbon is produced by decomposition in the gas mass, as will take place if the fuel bed temperature is carried too high, it is impossible to retain much of the carbon in the fuel bed. It is very light and finely divided, remains suspended in the gas and is swept out with the gas.

The separate steaming step described above has the purpose, besides the economic consumption of previously deposited carbon, with the prevention of its accumulation, of cooling the very high temperature zone produced by the air blast to a temperature appropriate for surface decomposition of fluid hydrocarbons, as above indicated. The steaming is preferably upward in the direction of the air blast, which carries heat upward and produces a deeper heated zone of lower maximum temperature, favoring the cracking of methane by surface effect and decreasing the tendency to decomposition in space.

The degree to which this control can be effected depends to some extent upon the degree of decomposition required. To crack the last percentage of methane requires, with a practical time factor, a higher temperature than that at which all the decomposition takes place on the hot surfaces of the fuel. The procedure outlined above, however, by carrying heat to the upper portions of the fuel bed, deepening the heated zone with a wider band of fuel at moderately high temperature favors the greater decomposition by surface effect and decreases the quantity of carbon carried out even when the cracking is carried to the extent that say only 3% to 10% methane remains in the cracked gas, as compared with operation without this step.

As an example of actual performance in which substantially all the carbon was retained and utilized in the process, may be cited the following.

Natural gas having the following composition was passed through the coke fuel bed of a standard water gas generator:—

| | Percentages by volume |
|---|---|
| $C_2H_6$ | 17.6% |
| $CH_4$ | 75.0% |
| $CO_2$ | 0.4% |
| $O_2$ | 0.2% |
| $N_2$ | 6.8% |
| B. t. u./cu. ft | 1053. |
| Sp. gr | .675 |

This was decomposed to "broken down gas" having the following composition:—

| | |
|---|---|
| $H_2$ | 59.9% |
| Illuminants | 1.4% |
| $C_2H_6$ | 0.7% |
| $CH_4$ | 33.1% |
| $CO_2$ | 0.2% |
| $N_2$ | 4.7% |
| B. t. u./cu. ft | 561. |
| Sp. gr | .299 |

To utilize the deposited carbon a quantity of blue water gas was produced equal to two thirds of the broken down gas.

The blue water gas had the following composition:—

| | |
|---|---|
| CO | 40.8% |
| $H_2$ | 45.2% |
| $CH_4$ | 0.9% |
| $CO_2$ | 4.7% |
| $O_2$ | 0.5% |
| $N_2$ | 7.9% |
| B. t. u./cu. ft | 284. |
| Sp. gr | .583 | which when added to the "broken down gas" gave a "reformed gas" of the following composition:—

| | |
|---|---|
| $H_2$ | 54.0% |
| $CH_4$ | 20.2% |
| CO | 16.3% |
| $CO_2$ | 2.0% |
| $N_2$ | 5.9% |
| $C_2H_6$ | .9% |
| $O_2$ | .3% |
| B. t. u./cu. ft | 450. |
| Sp. gr | .413 |

The coke fuel required was only 3.62 lbs. per 1,000 cu. ft. of reformed gas, the remaining heat required coming from the carbon released from the natural gas, substantially all of which was retained in the fuel bed and utilized in the air blasting and steaming steps.

In the particular operation cited, the "reformed gas" was enriched with natural gas to form 530 B. t. u. gas of .451 sp. gr. to be used interchangeably with coal gas modified with producer gas having a calorific power of 527 B. t. u./cu. ft. and a sp. gr. of .431.

It was found that by increasing the percentage of blue water gas made, with respect to the broken down gas, 530 B. t. u. gas could be made with the natural gas varying from approximately 5 to 3.3 therms per 1000 cu. ft. of finished gas, depending on the specific gravity desired in the finished gas, all with the production of substantially no lampblack in the gas leaving the fuel bed.

Capacities in an 11 ft. generator from 6,000,000 to 8,200,000 cu. ft. per day or more are possible.

A typical cycle in the above operations is as follows:—

| | Percent |
|---|---|
| Blow | 24 |
| Up steam | 33 |
| Down gas | 38 |
| Up steam | 5 |
| | 100 |

The gas may be run alternately up and down and the gas may be accompanied by steam which is not the temperature tempering steam but the above cycle is simple and satisfactory. Thermal efficiencies of the order of 90% were secured neglecting the steam produced by waste heat of the blast gases and the steam required by the operation.

An example of the operation of the process utilizing an oil refinery still gas may be cited. The composition of the oil refinery gas was as follows:—

| | |
|---|---|
| $C_6H_6$ | 0.08% |
| $C_2H_4$ | 5.0% |
| $C_3H_6$ | 4.7% |
| CO | 1.0% |
| $C_4H_8$ | 4.5% |
| $C_{2.29}H_{6.58}$ | 63.7% |
| $H_2$ | 5.3% |
| $CO_2$ | 0.5% |
| $O_2$ | 2.8% |
| $N_2$ | 11.7% |

This was decomposed and substantially all of the deposited carbon retained in the fuel bed and utilized there in the generation of heat and the production of blue water gas giving a "reformed gas" comprising the cracked gas and the blue water gas, of the following composition:—

| | |
|---|---|
| Illuminants | 1.7% |
| CO | 15.4% |
| $H_2$ | 54.4% |
| $CH_4$ | 16.8% |
| $C_2H_6$ | 0.7% |
| $CO_2$ | 2.4% |
| $O_2$ | 0.8% |
| $N_2$ | 7.8% |
| B. t. u./cu. ft | 449. |
| Sp. gr | .467 |

This reformed gas was enriched with oil refinery gas to give enriched gas of 530 B. t. u./cu. ft. and specific gravity of .497. In the particular operation cited, finished gas was desired that was replaceable for 530 B. t. u. coal gas modified with producer gas.

According to the above operation, 1000 cu. ft. of the oil refinery gas yielded 2847 cu. ft. of the enriched "reformed gas" with a thermal efficiency of the order of 85%, with a capacity in an 11' 0'' generator of the order of 5,500,000 cu. ft. per day.

This oil gas when decomposed to the above extent yielded large quantities of carbon. This large quantity of carbon was all substantially retained and utilized within the fuel bed, appreciably no lampblack being carried out of the fuel bed with the gases.

A typical cycle utilizing such an oil gas and producing such a reformed gas is as follows:

| | Percent |
|---|---|
| Blow—Air | 25 |
| Uprun—Steam | 3 |
| Oil gas | 33 |
| Steam | 3 |
| Downrun—Steam and oil gas | 33 |
| Uprun—Steam | 3 |

Repeat and then following with a blue water gas cycle:—

| | Percent |
|---|---|
| Blow | 25 |
| Up steam | 39 |
| Down | 33 |

With a standard water gas generator 11' 0'' diameter set capacities of 5,500,000 cu. ft. of enriched reformed gas of 530 B. t. u. are possible with a coke consumption of 3.6 lb. per 1000 ft. of finished gas and a thermal efficiency of the order of 85%.

In the operation of the present invention by carrying the decomposition of the hydrocarbons to the extent of producing cracked gas containing only say 3% to 10% methane and having a hydrogen content of 90% to 85%, large volumes of hydrogen may be produced for commercial hydrogenation processes per unit of hydrocarbon gas employed.

For instance, employing a 1500 B. t. u. oil refinery gas and operating a cycle as follows:—

Blast with air
    Steam upwardly
    Oil gas upward
    Steam upward
    Oil gas downward
    Steam downward
    Steam upward
    Repeat.

With the above operation, from 1000 cu. ft. of oil gas can be obtained 2400 cu. ft. of cracked gas—containing 90% $H_2$, 5% hydrocarbons largely methane, $CH_4$ 5% inerts, 2400 cu. ft. of blue water gas, containing 50% $H_2$, 40% $CO$, 10% inerts.

The blue water gas may be burned as fuel or enriched for distribution. However, by converting the CO in the blue water gas by passing the blue water gas over a catalyst (iron oxide, for instance) at elevated temperature according to the well known reaction, $$CO + H_2O = CO_2 + H_2$$

additional volumes of hydrogen may be secured, making the total hydrogen from the cracked gas and the blue water gas 4560 cu. ft. per 1000 cu. ft. of oil gas employed. Of this hydrogen, that in the cracked gas (2160 cu. ft.) is derived from the oil refinery gas alone, while of that in the blue water gas, a portion is derived from the reaction of the steam with the carbon produced by the decomposition of the oil gas and retained in the fuel bed for this utilization. This periodic production of blue water gas prevents the accumulation of the carbon with stoppage of the fuel bed and saves solid fuel.

The present process includes providing and maintaining an ignited fuel bed by periodic air blasting, decomposing fluid hydrocarbons by passing them through the fuel bed, with the liberation of hydrogen and carbon, and reducing the temperature of the fuel bed after the air blasting and prior to the hydrocarbon passage, whereby the decomposition of hydrocarbons is effected by contact with the hot fuel surfaces rather than in space, and whereby the carbon produced is retained in the fuel bed on the surfaces of the fuel leaving the fuel bed in porous condition and utilizing the deposited carbon in the production of blue water gas by passing steam through the fuel bed.

The retention within the fuel bed of the carbon produced by the decomposition of the hydrocarbons and its utilization therein is of decided value. It reduces the quantity of other fuel necessarily consumed to furnish heat for the process.

If the carbon is to any large extent carried out of the fuel bed, its disposal is a nuisance. Apparatus must be provided for its collection. It must be handled and stored. As carbon black, it is not of the best quality and the quantity that would be produced as an accompaniment to large scale operations for the production of gas for domestic or industrial consumption would swamp the present limited market.

The utilization within the fuel bed in the generation of heat by consumption by the air blast and the production of blue water gas by steaming to utilize the remainder and prevent accumulation, is an economic and convenient method of disposal of this carbon.

It will be noted from the foregoing that the process of the present invention is adapted to the production of gas rich in hydrogen, with varying contents of residual hydrocarbons, principally methane.

By varying the degree of decomposition, the resultant cracked gas may be available as commercial hydrogen, or with higher hydrocarbon content and mixed with varying quantities of blue water gas produced in the fuel bed, gas for domestic and industrial distribution may be produced having calorific power and specific gravity substantially matchable with other gas supplies.

It will be obvious to those skilled in the art to which the invention relates that modifications may be made in details of procedure without departing from the spirit of the invention which is not limited to such matters or otherwise than the prior art and the appended claims may require.

In the accompanying diagrammatic and schematic drawing

Figure 1:
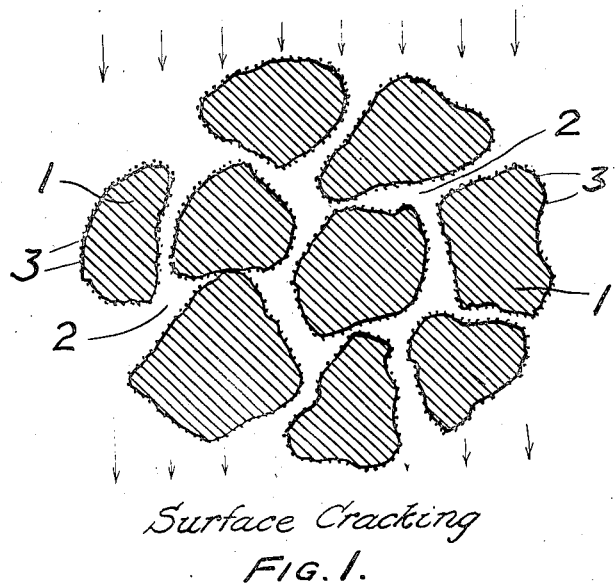

Figure 1 is a view which may be regarded as a conventionalized vertical cross-section illustrative of a portion of a fuel bed of coke and showing decomposition in contact with the surface of the fuel in accordance with the invention, and Fig. 2 is a similar view showing what is meant by decomposition in the gas mass.

In the drawing 1 represents fuel, making up the bed. 2 indicates the pores or voids in the fuel bed. The arrows indicate the hydrocarbon gases. 3 indicates the liberated or deposited carbon.

I claim:

1. The process of producing gas rich in hydrogen and substantially free from carbon black resulting from hydrocarbon decomposition which comprises periodically air blasting an ignited bed of fuel, between air blasting steps passing hydrocarbon gases therethrough and decomposing them to carbon and cracked gas consisting principally of hydrogen and methane, and retaining substantially all of the liberated carbon within the fuel bed and on the surfaces of the fuel for subsequent utilization of the carbon therein, preserving the porosity of the fuel bed by reducing the temperature of the surface of the fuel bed prior to the passage of the hydrocarbon gas sufficiently to cause methane contained in the original hydrocarbon gas and such methane as is produced by decomposition of higher hydrocarbons to be decomposed by contact with the surface of the fuel rather than in space in the gas mass.

2. The process of producing gas rich in hydrogen and substantially free from carbon black resulting from hydrocarbon decomposition which includes periodically air blasting an ignited bed of fuel, passing hydrocarbon gases therethrough and decomposing them to carbon and cracked gas consisting principally of hydrogen and methane and retaining substantially all of the liberated carbon on the surfaces of the fuel for subsequent utilization by reducing the temperature of the fuel bed, after the air blasting and prior to the passage of the hydrocarbon gas, by passing steam through the fuel bed sufficiently to cause methane contained in the hydrocarbon gas and such methane as is formed by cracking of higher hydrocarbons to be decomposed by contact with the surface of the fuel rather than in space in the gas mass.

3. The process of producing gas rich in hydrogen and substantially free from carbon black resulting from hydrocarbon decomposition which includes periodically airblasting an ignited bed of fuel, between air blasting steps passing hydrocarbon gas containing methane and higher hydrocarbons and decomposing them therein, liberating carbon and cracked gas consisting principally of hydrogen and methane, and retaining within the fuel bed substantially all of the carbon liberated for subsequent utilization therein by controlling the temperature of the fuel bed prior to the passage of the hydrocarbon gas so that it is high enough to decompose the higher hydrocarbons to methane and low enough to cause the methane to be decomposed by surface contact substantially, rather than in space in the gas mass.

4. The process of producing gas rich in hydrogen and substantially free from carbon black resulting from hydrocarbon decomposition which includes periodically air blasting an ignited fuel bed, between blasting steps passing hydrocarbon gas therethrough and decomposing it to carbon and cracked gas consisting principally of hydrogen, and retaining the greater bulk of the liberated carbon within the fuel bed by reducing the temperature of the hottest zone of the fuel bed and producing a deep zone of moderate temperature by passing steam upward through the fuel bed prior to the passage of the hydrocarbon gas therethrough, thereby favoring the decomposition of methane contained in the gas or formed by initial cracking, by contact with the fuel bed surfaces and minimizing the decomposition in space in the gas mass.

5. The process of producing gas rich in hydrogen and substantially free from carbon black resulting from hydrocarbon decomposition which includes periodically air blasting an ignited fuel bed, between blasting steps passing through the fuel bed hydrocarbon gas containing methane or containing higher hydrocarbons initially decomposing largely to methane, and decomposing them therein to carbon and cracked gas consisting principally of hydrogen and methane, limiting the temperature of the fuel bed prior to the passage of the hydrocarbon gas to cause the methane to be decomposed by surface contact thereby retaining within the fuel bed substantially all of the carbon produced, and preventing the accumulation of the carbon so retained by passing steam through the fuel bed to react with the carbon and produce blue water gas.

6. The process of producing gas rich in hydrogen and substantially free from carbon black resulting from hydrocarbon decomposition which includes periodically air blasting an ignited fuel bed, between air blasting steps passing fluid hydrocarbons therethrough decomposing them to carbon and cracked gas consisting principally of hydrogen and methane, regulating the temperature of the fuel bed prior to the passage of the hydrocarbons to cause the decomposition of methane substantially by surface contact only, thereby retaining the produced carbon in the fuel bed, and consuming the retained carbon with steam to produce blue water gas and prevent the accumulation of the carbon.

7. In the process of producing gas rich in hydrogen and substantially free from carbon black resulting from hydrocarbon decomposition by the pyrogenous decomposition in an ignited fuel bed of hydrocarbon fluids containing methane or forming methane by initial decomposition, the improved step consisting in regulating the temperature of the fuel bed prior to the introduction of the hydrocarbon fluid to cause methane to be decomposed principally by surface contact, whereby substantially all the carbon liberated by the decomposition of the methane is retained within the fuel bed and on the surfaces of the fuel providing porosity.

8. In the process of producing gas rich in hydrogen and substantially free from carbon black resulting from hydrocarbon decomposition by the pyrogenous decomposition of hydrocarbon fluids containing higher hydrocarbons initially decomposing to methane, the improved step which consists in regulating the fuel bed temperature prior to such decomposition to produce temperature conditions sufficiently high to cause the decomposition of the higher hydrocarbons to methane and sufficiently low to cause the decomposition of methane principally by surface contact rather than in space, thereby retaining within the fuel bed substantially all of carbon liberated by the decomposition.

9. In the process of producing gas rich in hydrogen and substantially free from carbon black resulting from hydrocarbon decomposition by the pyrogenous decomposition of methane containing hydrocarbons in an ignited fuel bed provided and maintained by periodic air blasting, the improved step which consists in passing steam through the fuel bed forming blue water gas to regulate the temperature of the fuel bed prior to the decomposition of the hydrocarbons causing methane to be decomposed by surface contact rather than in space, thereby retaining in the fuel bed the carbon liberated by the decomposition for subsequent utilization in the generation of heat and blue water gas.

10. The process of producing gas rich in hydrogen and substantially free from carbon black resulting from hydrocarbon decomposition from hydrocarbon gases, which comprises air and steam blasting an ignited fuel bed to a temperature fit for the surface decomposition of methane in contact with the heated surface of the fuel and unfit for decomposing methane in the gas mass and in space in the fuel bed, then passing the hydrocarbon gases through said fuel bed cracking the same to hydrogen and methane and decomposing the methane by surface decomposition in contact with the fuel surface and depositing carbon in form adherent to the surface of the fuel, and eliminating the deposited carbon by consuming it in the fuel bed at recurrent steam and air blasting steps.

11. The process of producing gas rich in hydrogen and substantially free from carbon black resulting from hydrocarbon decomposition from hydrocarbon gases, which comprises heating the surface of an ignited fuel bed sufficiently to decompose hydrocarbons of the hydrocarbon gas by surface decomposition and insufficiently to decompose said hydrocarbons in space in the gas mass by air and steam blasting the fuel bed with generation of water gas and air blast gas, liberating carbon in a form which remains deposited on the surface of the fuel by passing the hydrocarbon gas through the fuel bed and decomposing it by surface decomposition in contact with the heated surface of the fuel, and eliminating the deposited carbon from the fuel bed by consuming it in the fuel bed in recurrent steam and air blasting steps.

12. In the process of producing gas rich in hydrogen by the decomposition of hydrocarbon fluids with utilization of the liberated carbon, which includes periodically air blasting an ignited fuel bed and cracking the hydrocarbon fluid in the ignited fuel bed by passing it therethrough, the improvement which consists in maintaining the porosity of the fuel bed and retaining a controllable quantity of the deposited carbon on the surfaces of the fuel by passing steam through the fuel bed between air blasting steps generating water gas from previously liberated carbon unconsumed by the air blasting and lowering the temperature of the fuel bed, and by decomposing methane by surface effect in the steps of passing the hydrocarbon fluid through the fuel bed after the steaming and temperature lowering steps.

13. In the process of producing gas rich in hydrogen and substantially free from carbon black resulting from hydrocarbon decomposition by the decomposition of hydrocarbon fluids with utilization of the liberated carbon, which includes periodically air blasting an ignited fuel bed and cracking the hydrocarbon fluid in the ignited fuel bed by passing it therethrough, the improvement which consists in utilizing the surface effect decomposition at the surfaces of the fuel of methane by passing steam through the fuel bed between air blasting steps generating water gas from previously liberated carbon unconsumed in the air blasting and lowering the temperature of the fuel bed in advance of the step of passing the hydrocarbon fluid through the fuel bed.

14. The process of producing gas rich in hydrogen which includes periodically air blasting an ignited bed of fuel, between air blasting steps passing hydrogen gas containing methane and higher hydrocarbons through the fuel bed and decomposing the gas therein, liberating carbon and cracked gas consisting principally of hydrogen and methane, and retaining within the fuel bed substantially all the carbon liberated for subsequent utilization therein by reducing the temperature of the fuel bed to not more than 1200° C. prior to the passage of the hydrocarbon gas so that the fuel bed temperature is high enough to decompose the higher hydrocarbons to methane and low enough to cause the methane to be decomposed by surface contact substantially rather than in space in the gas mass.

15. The process of producing gas rich in hydrogen which includes periodically air blasting an ignited bed of fuel, passing hydrocarbon gas therethrough and decomposing the gas to carbon and cracked gas consisting principally of hydrogen and methane, and retaining substantially all of the liberated carbon on the surfaces of the fuel for subsequent utilization by reducing the temperature of the fuel bed to not more than 1200° C. after the air blasting and prior to the passage of the hydrocarbon gas, by passing steam through the fuel bed sufficiently to cause the methane contained in the hydrocarbon gas and such methane as is formed by initial cracking of the higher hydrocarbons to be decomposed by contact with the surfaces of the fuel rather than in space in the gas mass.

16. In the process of producing gas rich in hydrogen and substantially free from carbon black resulting from hydrocarbon decomposition by the pyrogenous decomposition of methane forming hydrocarbons in an ignited fuel bed provided and maintained by periodic air blasting, the improved step which consists in passing steam through the fuel bed forming blue water gas to regulate the temperature of the fuel bed prior to the decomposition of the hydrocarbons causing methane to be decomposed by surface contact rather than in space, thereby retaining in the fuel bed the carbon liberated by the decomposition for subsequent utilization in the generation of heat and blue water gas.

HARUTYUN G. TERZIAN.